Figure 1:
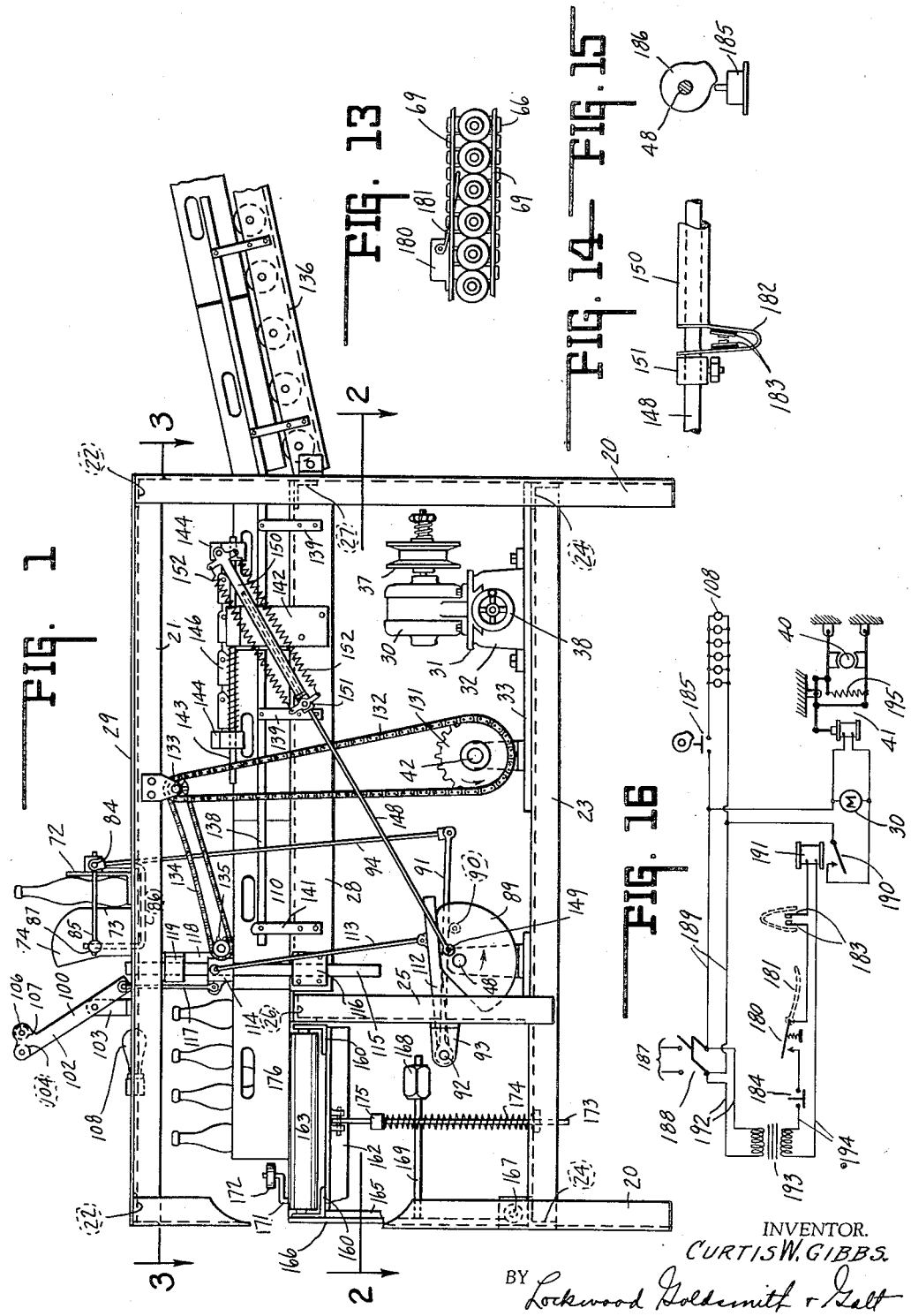

April 1, 1941.  C. W. GIBBS  2,236,945
MIXING, INSPECTION, AND CASING MACHINE FOR BOTTLED GOODS
Filed July 18, 1938  3 Sheets-Sheet 1

INVENTOR.
CURTIS W. GIBBS.
BY Lockwood Goldsmith & Galt
ATTORNEYS.

April 1, 1941.  C. W. GIBBS  2,236,945

MIXING, INSPECTION, AND CASING MACHINE FOR BOTTLED GOODS

Filed July 18, 1938  3 Sheets—Sheet 2

INVENTOR.
CURTIS W. GIBBS.
BY Lockwood Goldsmith & Galt
ATTORNEYS.

April 1, 1941. C. W. GIBBS 2,236,945
MIXING, INSPECTION, AND CASING MACHINE FOR BOTTLED GOODS
Filed July 18, 1938 3 Sheets-Sheet 3
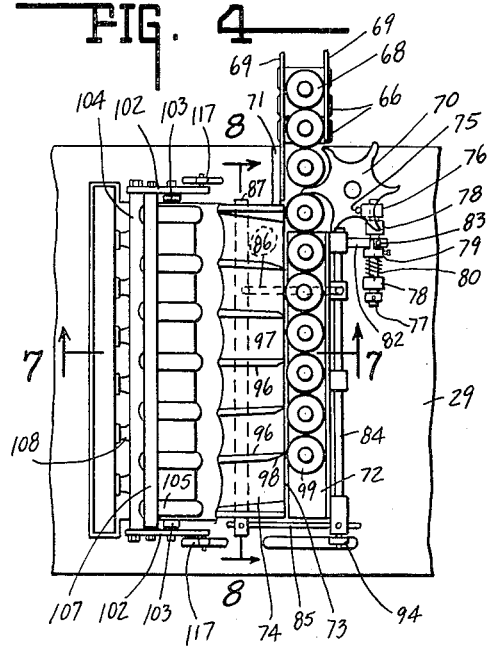
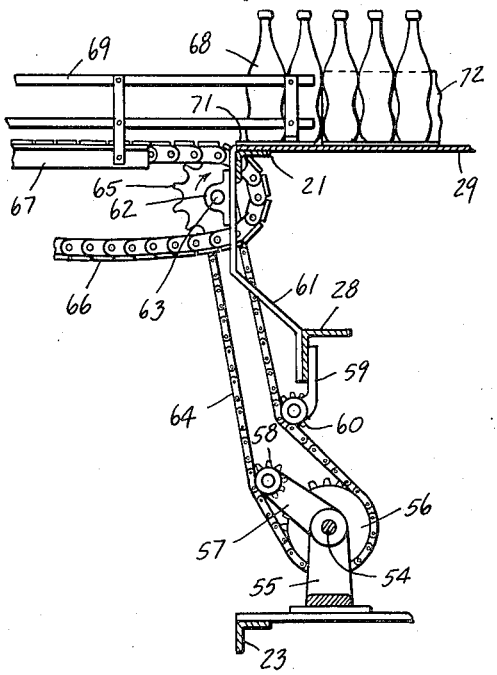
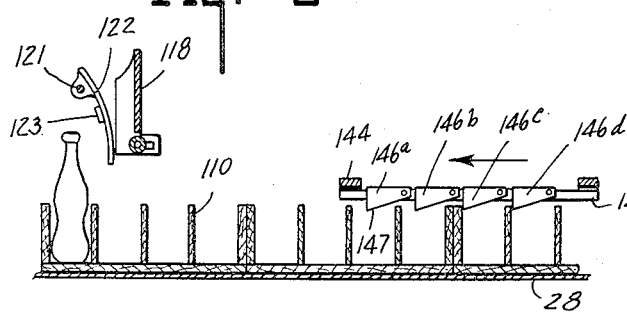
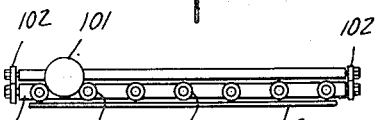
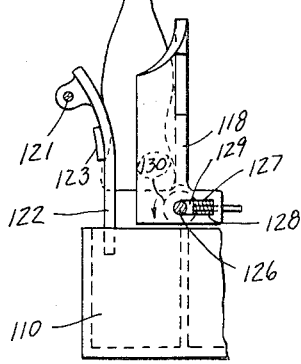
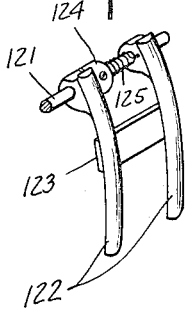
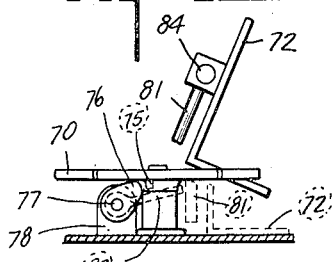
INVENTOR.
CURTIS W. GIBBS.
BY Lockwood Goldsmith & Galt
ATTORNEYS.

Patented Apr. 1, 1941

2,236,945

UNITED STATES PATENT OFFICE 2,236,945

MIXING, INSPECTION, AND CASING MACHINE FOR BOTTLED GOODS

Curtis W. Gibbs, Forth Worth, Tex., assignor, by direct and mesne assignments, to Bottlers Equipment Company, Forth Worth, Tex., a corporation Application July 18, 1938, Serial No. 219,759

7 Claims. (Cl. 226—14)

This invention relates to a mixing, inspection and casing machine for bottling goods. While the machine is primarily designed to perform these three functions, certain features thereof are equally applicable to machines in which one or more of these functions are omitted. Other features are applicable to machines for casing or packaging other than bottled goods.

One object of the invention is to reduce labor costs by combining the three functions and especially the inspection and casing operations in one machine which requires but one operator.

Another object of the invention is to provide a casing machine in which no accumulating table is required. The goods, instead of being assembled on such a table for hand packing or for the assembly of a unit the size of a case, is assembled in single rows and each row is deposited in the case individually.

Another object of the invention is to provide a machine in which bottles of different diameters may be cased without adjustment.

Another object of the invention is to provide a machine in which the bottles are positioned with their axes inclined downwardly toward the neck end during inspection. The placing of the bottles in this position is done immediately prior to inspection so that foreign matter floating therein may be seen moving from the neck end to the base end of the bottle and is, therefore, more readily visible to the operator. At the same time, the base end of the bottle is left clear so that foreign matter stuck to the bottom thereof may easily be seen by the inspector.

Another object of the invention is to provide means by which a plurality of bottles may be placed in inspection position at one time, thus eliminating the necessity of extremely rapid passage past an inspection position.

Another object of the invention is to provide a mixing operation in the same machine which does the casing and in which the inspection is done. The mixing operation is performed by tilting the bottles into the inspection position and then restoring them to an upright position when they are placed in the case. This operation gives sufficient mixing for certain types of soft drinks. For bottled goods which require a more thorough mixing on a separate machine the amount of the separate mixing and the time required are greatly reduced when the present machine is used for a preliminary mixing operation.

Figure 2:
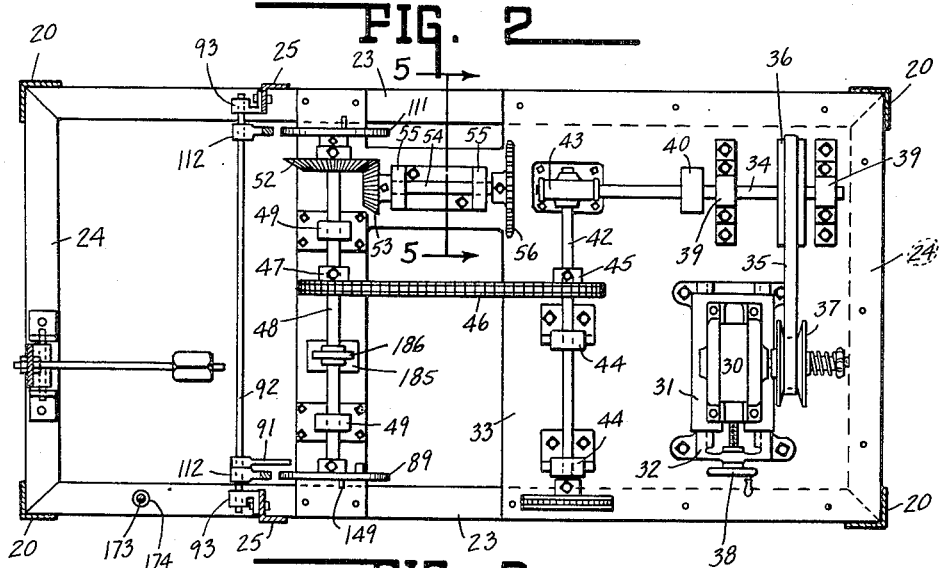
Figure 3:
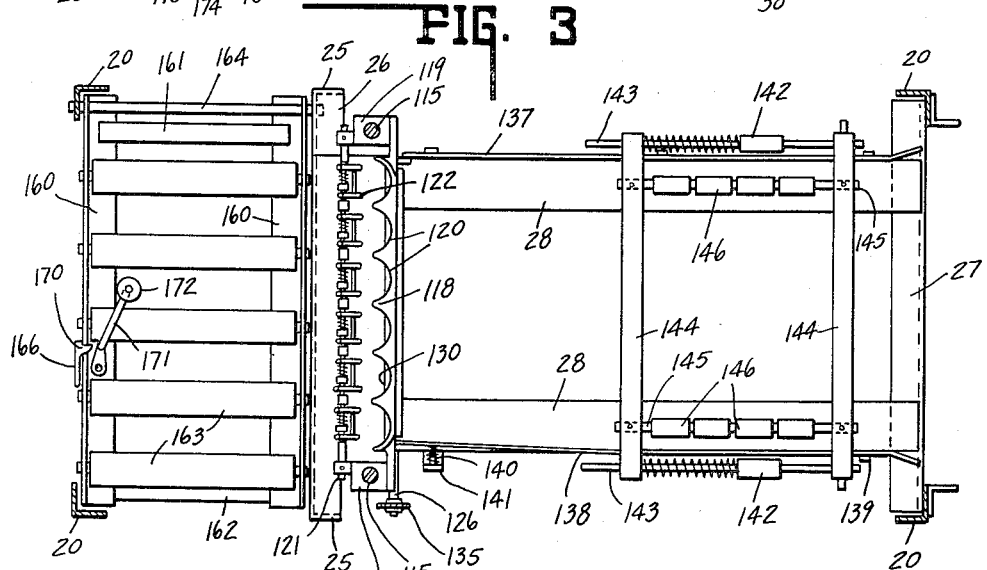
Figure 7:
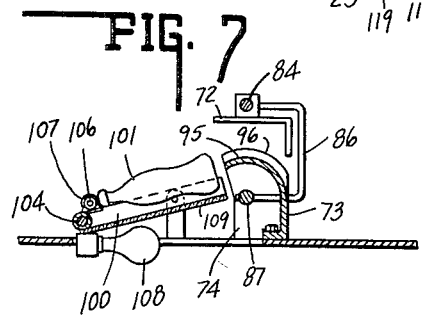
Figure 8:
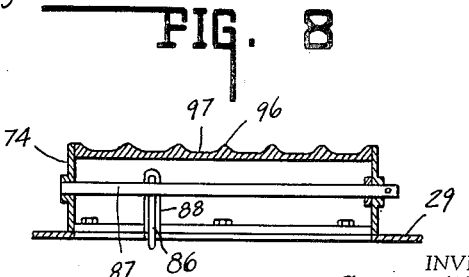

Other objects and features of the invention will be understood from the accompanying drawings and the following description and claims:

Fig. 1 is a side elevational view of the machine as a whole. Fig. 2 is a sectional plan view taken on the line 2—2 of Fig. 1. Fig. 3 is a similar view taken on the line 3—3 of Fig. 1. Fig. 4 is a plan view of a portion of the top of the machine. Fig. 5 is a fragmentary sectional view taken substantially on the line 5—5 of Fig. 2. Fig. 6 is a central sectional view in elevation with parts omitted. Fig. 7 is a sectional view taken on the line 7—7 of Fig. 4. Fig. 8 is a sectional view taken on the line 8—8 of Fig. 4. Fig. 9 is an elevational view of a receiver used at the inspection station with one bottle in position thereon. Fig. 10 is a detailed view in elevation of certain parts of the mechanism used for placing bottles in the cases. Fig. 11 in a perspective view of one of the elements shown in Fig. 10. Fig. 12 is an elevational view with parts in section of a counting mechanism used for controlling the supply of bottles to the machine. Fig. 13 is a plan view of a portion of a conveyor used for delivering bottles to the machine and illustrating the position of an electrical control element used therewith. Fig. 14 is a detailed view in plan of a safety switch used for automatically stopping the machine in an emergency. Fig. 15 is an elevational view of a cam operated switch which may be used for controlling illumination of the bottles during inspection. Fig. 16 is a diagram of wiring connections.

In the preferred form of the invention shown in the drawings, the filled bottles are received from the bottling machine on an endless conveyor of the platform chain type in a continuous stream and in an upright position. The cases to be filled are delivered to the machine by a suitable conveyor and are shown herein as the usual partitioned cases having twenty-four bottle-holding cells arranged in four rows of six cells each. The bottles are counted by a counting and stream controlling device as they arrive at the machine and the flow of the stream of bottles is automatically stopped thereby each time enough bottles have been received to fill one row in a case. The counted bottles are delivered to a pivotally mounted receiving member which is operated, when the stream has been stopped, to move a group of bottles from the stream and pass the same over a guide member having diverging channels therein which space the bottles properly for delivery to the case. The bottles are tilted in their movement over the guide member and are discharged therefrom in the tilted position onto a receiver located at the inspection position. Thereupon the pivotal receiving member returns to its initial position, the flow of the bottle stream is automatically resumed and another group of bottles is counted onto said receiving member.

The group of bottles remain on the inspection receiver for a sufficient length of time to permit thorough inspection of the entire group. During this time a light, preferably positioned beneath the receiver, shines through the bottles to permit the contents thereof to be completely visible to the inspector. At the end of the inspection period, the inspection receiver is tilted to discharge the bottles therefrom in an upright position into a waiting case. Mechanism is provided for lowering the bottles gently toward the case until their bases are sufficiently close to the floor of the case to prevent breakage in dropping.

The cases are moved step by step to the filling position, one row of cells being positioned for filling at each step. Automatic means are provided for varying the length of the steps to compensate for the longer spacing between the last row of one case and the first row of the next, as compared to the spacing between rows of cells in the same case. When a case is completely filled it is automatically discharged from the machine onto a suitable conveyor which may take the same to a storage point or to a mixing machine for further mixing, as may be desired.

Stationary frame

In the preferred form of the invention shown in the drawings, the stationary framework of the machine consists of four corner posts 20 secured together by upper longitudinal frame members 21, upper lateral frame members 22, lower longitudinal frame members 23 and lower lateral frame members 24. A pair of vertical frame members 25 are supported on the longitudinal members 23 and carry a cross member 26 at their upper ends. A cross member 27 is supported by two of the corner posts 20. A pair of longitudinal frame members 28 are supported on the cross members 26 and 27, respectively. A deck plate 29 rests upon the frame members 21 and 22.

Driving mechanism

Power for all of the operations of the machine is supplied from a motor 30 mounted on a sliding base 31 in turn carried by a fixed base 32. The base 32 is mounted on a plate 33 supported by the frame members 23 and 24. The motor drives a shaft 34 by means of a belt 35 trained about a pulley 36 secured to said shaft and about a pulley 37 secured to the shaft of the motor. The pulley 37 is one of a well known type whose effective diameter may be varied by moving the motor and its sliding base by means of a hand wheel 38. The speed at which the motor drives shaft 34 may thus be varied.

The shaft 34 is supported on bearings 39 and carries a brake drum 40 which may be acted upon by any suitable form of solenoid brake, not shown in Fig. 2 but shown diagrammatically at 41 in Fig. 16. The shaft 34 drives a shaft 42 through a worm and worm wheel contained in a housing 43. The shaft 42 is supported on bearings 44 and carries a sprocket 45 about which there is trained a chain 46. Said chain drives a sprocket 47 secured to a shaft 48. Said shaft is supported on bearings 49. Power for the several operations of the machine is supplied from shaft 42 and 48 by suitable sprockets, gears and cams to be described hereinafter.

Conveyor for incoming bottles

The shaft 48 carries a beveled gear 52 meshing with a beveled pinion 53 secured to a shaft 54. Said shaft is mounted on bearings 55 and has secured thereto a sprocket 56. An arm 57 (Fig. 5) extends from one of the bearings 55 and has freely mounted thereon a sprocket 58. An arm 59 is secured to one of the frame members 28 and has freely mounted thereon a sprocket 60. A pair of straps 61, only one of which appears in Fig. 5, are secured to the frame members 21 and 28 and have fastened thereto bearings 62 in which there is journaled a shaft 63. A chain 64 is trained about the sprockets 56, 58 and 60 and about a suitable sprocket on shaft 63, not shown. Said shaft also carries a sprocket 65 about which is trained a conveyor chain 66 of the platform type. The upper run of said chain is supported in a channel 67 which may be supported in any suitable manner and which may extend from the bottling machine for supplying a continuous stream of filled bottles 68 to the machine. Said conveyor chain is constantly driven as long as the motor 30 is in operation.

Counting and stream control device

The bottles 68 delivered on the conveyor chain 66 are guided by side rails 69 to a starwheel 70 pivotally mounted on the deck plate 29. The friction between the chain 66 and the bases of the bottles 68 is sufficient to push the bottles across a dead plate 71 past the starwheel 70 and onto an L-shaped receiving member 72. In the movement to the receiving member the bottles are guided by the vertical face 73 of a guide member 74 and in passing the starwheel 70 they cause the same to rotate. Said starwheel has the same number of points as there are cells in one row in the cases to be filled, herein shown as six. The starwheel carries a pin 75 adapted to engage a latch 76 for stopping rotation of the star wheel and thus stopping the movement of the bottles on the conveyor 66. When said movement is stopped said conveyor may slip beneath the bases of the bottles thereon. The latch 76 is secured to a stem 77 journaled on bearings 78 carried by the deck plate 29. Said stem has secured thereto a collar 79 engaged by a torsion spring 80 which also engages one of the bearings 78 and tends to retain the latch 76 in the upraised position shown in Fig. 12, in which position said latch is in the path of movement of the pin 75.

The receiving member 72 normally rests upon the deck plate 29 as shown by broken lines in Fig. 12 but may be raised, as shown by solid lines in said figure, by mechanism to be hereinafter described. Said receiving member is raised after the flow of bottles has been stopped by engagement of pin 75 with latch 76 and is returned to its normal position when the bottles carried thereby have been delivered to the inspection station. In the return of the receiving member 72, a pin 81 carried on the back thereof strikes a trigger 82 which is pivotally mounted on the stem 77 and is provided with a projection 83 engaging a projection on the collar 79, as best seen in Fig. 4. The consequent movement of the trigger 82 moves collar 79 to rock the stem 77 and to free the latch 76 from the pin 75. The starwheel 70 is then free to rotate and permits the resumption of movement of the stream of bottles. As the receiving member 72 resumes its normal position, the pin 81 slips past the trigger 82, as shown in Fig. 12, thus permitting the latch 76 to return to the path of travel of pin 75 to stop the same when six more bottles have been placed on the receiving member 72. In the upward movement of the receiving member 72, the pin 81 may strike the trigger 82 and move the same upwardly without affecting the position of the latch 76. By this means, the flow of the stream of bottles is controlled to place six bottles on the receiving member 72 each time the same is returned to its normal position and then to stop the flow of bottles until the receiving member has delivered the six bottles to the inspection station and has returned to its normal position.

Mechanism for moving bottles to the inspection station

The receiving member 72 has secured to the back thereof a rod 84 which is in turn secured to a pair of arms 85 and 86 which are attached to a shaft 87 journaled on the guide member 74. The arm 86 is shaped as best seen in Fig. 7 and operates in a suitable slotted opening 88 in the deck plate 29 and in the guide member 74. By this means the receiving member 72 is pivotally mounted for a rocking movement about the axis of the shaft 87.

The shaft 48 carries a cam 89 which in turn carries a roller 90 engaging a follower 91 in the form of a lever freely mounted on a shaft 92 supported in bearings 93 on the frame members 25. A pitman 94 is connected to the end of the follower 91 and to the rod 84. By means of this construction, the receiving member 72 is rocked about the shaft 87 once in each revolution of the shaft 48.

The upper surface 95 of the guide member 74 is substantially concentric with the axis of the shaft 87, as best seen in Fig. 7, and is provided with ribs 96 forming guide channels 97 therebetween. Said ribs, as best seen in Fig. 4, are set at the proper angle with respect to each other to insure that the channels 97 diverge. The ribs 96 are also beveled as shown at 98 to facilitate entrance of the bottles to the channels 97.

When the bottles are received on the receiving member 72, they are in contact with each other, as shown in Fig. 4, since they are moved on to said member by pressure from the moving stream. As the receiving member 72 is lifted, the sides of the bottles engage the upper surface of the guide member, and the ribs 96 act to space the same apart to the proper spacing to correspond with the cells in the case to which they are to be delivered. The spacing of the cells in the cases is generally standard, irrespective of the actual diameter of the bottles to be placed therein, while the diameter of the bottles varies considerably with various makes of bottled drinks. With the arrangement of the ribs 96 illustrated herein, bottles having a diameter so small that the center of the first bottle 99 in the row actually coincides with the adjacent rib 96 may be properly spaced, since the accumulated pressure of the ribs on the remaining bottles will force the bottle 99 to the proper side of the rib. Obviously, if larger bottles are used, the bottle 99 will be positioned in a more advantageous position to enter its appropriate guide channel. Thus, the same spacing mechanism may be used on bottles of varying diameter without the necessity of any manual adjustment.

Inspection station

The movement of the receiving member 72 just described lifts six of the bottles from the stream, passes them over the surface of the guide member 74, spaces them apart and at the same time tilts them through an angle of at least 90 degrees and delivers the same to an inspection receiver 100 in the position shown by the bottle 101 in Fig. 7, in which position the axis of the bottle is inclined downwardly toward the neck end. The receiver 100 consists of a pair of parallel side plates 102 pivotally mounted on a pair of brackets 103 secured to the deck plate 29. A tubular member 104 is secured to the side plates 102 and has secured thereto a plurality of tubular members 105, forming between them six spaces in which bottles may rest. A rod 106 is secured between the guide plates 102 and is covered by a tube 107, preferably of rubber or other resilient material to form a resilient stop for the bottles. As the bottles slide from the guide member 74 to the receiver 100, the caps thereof strike the resilient stop 107 which cushions the shock.

Beneath the inspection receiver 100 there are positioned a plurality of electric lamps 108. A sheet 109 of translucent material, which may be ground glass or any of several well known resin plastics, is secured to the under surface of the members 105. The lamps 108 are preferably lighted only during the time that bottles are in position on the inspection receiver and then project their light through the translucent sheet 109 and through the bottles and their contents. The inspector is thus able to see the contents of the bottle by means of the light shining therethrough and the use of the translucent sheet 109 greatly reduces the strain on the inspector's eyes in this operation. The delivery of bottles to the inspection receiver is sufficiently rapid so that any foreign matter which may have been floating in the neck thereof while in the upright position, will still be moving toward the base end when the bottles reach the inspection position. Similarly, heavier material which may have been resting on the bottom of the bottle will be moving toward the neck end. The moving material is, of course, much more readily visible to the inspector than stationary material confined in the neck of the bottle or resting on the bottom. Furthermore, the placing of the bottle in a reclining position permits the inspector to look completely through the base of the bottle which in this position has no supporting plate in contact therewith, as is the case when bottles are inspected in an upright position. In the latter case, the dark background of a supporting plate often prevents the discovery of foreign matter which may have remained stuck to the interior of the bottle at the base. The inspection, therefore, is much more efficient than when bottles are inspected in an upright position.

When one or more of the bottles fails to pass inspection they may be removed by hand from the inspection receiver and replaced from a stock of bottles kept standing on deck plate 29 for the purpose. Ordinarily the removal and replacement may be done without stopping the machine, but a snap switch is provided for the operator by means of which the machine may be stopped if necessary.

Mechanism for moving bottles from the inspection station to the case

When the bottles have remained sufficiently long at the inspection station to permit a thorough inspection, the receiver 100 is tilted as shown in Fig. 1 to slide the same from said receiver downwardly through a suitable opening in deck plate 29 to a case 110 supported on frame members 28. The tilting of the receiver is accomplished by cams 89 and 111 carried by opposite ends of shaft 48. Said cams are identical in shape and each is engaged by a follower 112 freely mounted on the shaft 92. Each of the followers 112 is connected by a link 113 to a block 114 secured to a vertical bar 115. Said bars are slidably mounted in bearings 116 on the frame members 28 and on suitable bearings beneath deck plate 29. The blocks 114 are connected by links 117 to the ends of the side plates 102 of the inspection receiver 100. By this means the rotation of the cams 89 and 111 alternately raises the links 113 and 117 to place the receiver 100 in the receiving position of Fig. 7 and permits the same to be lowered to move the same to the discharging position of Fig. 1. The movable parts may be made sufficiently heavy to insure that the latter motion is accomplished by gravity or suitable counterweights or springs may be provided if necessary.

Beneath the deck plate 29 there is provided a means for guiding the bottles into the case including a guide member 118 (Figs. 3, 6 and 10) which is secured at its ends to blocks 119 slidably mounted on the vertical bars 115. Said guide member is provided with a plurality of channels 120 suitably spaced to receive the bottles from the receiver 100. A rod 121 is fixed in suitable bearings on the blocks 119 and has mounted thereon opposite each of the channels 120 a finger unit shown in perspective in Fig. 11. Each of said units consists of a pair of fingers 122 connected by a cross bar 123 and freely mounted on the rod 121. Between said fingers a collar 124 is secured to the rod and is engaged by a torsion spring 125 also engaging one of the fingers and urging the same toward the guide member 118. The tension of said springs is sufficient so that when a bottle is slid from the receiver 100 into one of the channels 120 the corresponding fingers 122 engage the side of bottle with enough force to hold it closely against the face of the channel as shown in Fig. 10.

In the lower end of the guide member 118, a shaft 126 is journaled in slotted openings 127 at each end. Said shaft is normally retained in one end of said openings by a spring 128 operating upon a sliding bearing member 129, there being one of said springs and bearings at each end of the shaft. A roller 130 preferably faced with rubber is mounted on said shaft and is in position to intercept one edge of each of the bottles as they are dropped from the receiver 100.

The shaft 126 and roller 130 are constantly rotated by means of a sprocket 131 on the shaft 42 (Fig. 1), a chain 132 engaging the same and engaging a sprocket carried by a stub shaft 133 mounted on one of the frame members 21, and a chain 134 trained about another sprocket secured to the first on said stub shaft and about a sprocket 135 secured to the shaft 126.

In the operation of this portion of the apparatus, the blocks 119 are engaged by the blocks 114 when the latter are raised to place the receiver 100 in receiving position. The blocks 119 are thus elevated to place the guide member 118 and fingers 122 in the raised position shown in Fig. 6. When the receiver 100 is tilted to deliver the bottles, the lowering of blocks 114 permits the guide member 118 to be lowered into a position resting upon the case 110 with the fingers 122 extending into the cells of the case to be filled as shown in Fig. 10.

With the parts in this position the bottles are delivered from the receiver 100 and engage the rotating roller 130. The rotation of the roller draws the bottle downward at a sufficiently slow rate of speed to lower it gently into the case and because of its resilient mounting is able to follow the contour of irregularly shaped bottles.

When the bottles have been placed in the case the guide member 118 and fingers 122 are again raised in the return of the receiver 100 to receiving position. In this movement said parts are elevated sufficiently to permit the necks of the bottles to pass between fingers 122 and to clear the cross member 123.

Case handling mechanism

The cases to be filled are preferably supplied in a continuous stream by a gravity conveyor 136 (Fig. 1) of the type commonly used in bottling plants. Said conveyer may have one end attached to the frame of the machine and is arranged to deliver the cases to the frame members 28 on which they may travel to the filling position represented by the guide 118. A guide rail 137 is fixed to one of the members 28 (Fig. 3) and a flexible guide rail 138 is secured to the other of said members by straps 139 but has the end nearest the filling position pressed inwardly by a spring 140 resting against an abutment 141. The flexible guide rail insures that the cases will be accurately positioned against the fixed guide rail 137 irrespective of small variations in dimensions.

Each of the frame members 28 has secured thereto a bracket 142 in which there are slidably mounted a pair of horizontally arranged parallel rods 143 carrying fixed thereto a pair of cross bars 144. Said cross bars carry longitudinal bars 145 on which there are pivotally mounted a plurality of channel shaped pawls 146. Each of said pawls rests astride one of said bars and has a downwardly extending corner 147 on each side extending into the cases on the frame members 28. The rods 143 and the members carried thereby and just described constitute a rigid frame which may be reciprocated on the brackets 142 to bring the pawls successively into engagement with the edges of the cases for moving the same step by step toward the filling position.

The reciprocation of the frame just described is accomplished by means of a construction shown in Fig. 1 and duplicated on the opposite side of the machine. Said construction includes a connecting rod 148 connected to a crank pin 149 on the cam 89. The opposite end of said connecting rod slides within a tubular member 150 which is pivotally connected to one end of one of the cross bars 144. A collar 151 carried by the rod 148 normally abuts against the end of the tubular member 150 and carries a pair of arms to which there are attached tension springs 152 which are also attached to similar arms on the tubular member 150. Said springs normally retain said members in contact but are adapted to yield to prevent damage if the movement of the cases meets with more than a predetermined resistance.

In the operation of the apparatus just described, the pawls 146 are moved backward and forward once in each rotation of the shaft 48. At each backward movement one of the pawls on each side passes the inner edge of one of the cases and on the forward movement said pawls engage said edge and move the case toward the filling position. Because of the fact that the side walls of a case are invariably thicker than the partitions and two such side walls occur between the last row of cells in one case and the first row in the next, the movement required to bring the first row in a case to the filling position must be longer than the movement to bring succeeding rows in the case into position. In order to accomplish this variable movement there are provided as many pawls on each side of the machine as there are rows of cells in the cases to be filled. Said pawls are positioned with their operating corners 147 spaced apart a distance equal to the shorter steps, while the amplitude of the reciprocating movement is sufficient for the longer steps. The pawls are placed in such position with relation to the filling position that when the rearmost pawl 146d engages the inner edge of the side wall of a new case, the limit of its forward movement brings the first row of cells in another case to the filling position. In the next movement pawl 146c engages the side wall of the new case and moves the second row of cells of the case 110 into filling position as illustrated in Fig. 6. In the third and fourth movements pawls 146b and 146a successively engage the side wall and move the third and fourth rows of case 110 into filling position. On the fifth movement however, the side wall of a new case has reached the proper position to be engaged by pawl 146d. Because of the thickness of the abutting side walls of the two cases at this point the engagement takes place at a point much farther back in the movement of the pawls and the forward motion of the cases is accordingly that much greater.

Case discharging mechanism

At the left end of the machine, referring to Figs. 1 and 3, there is provided a discharge device consisting of a pair of angle members 160 secured together by cross members 161 and 162 and carrying a number of rollers 163. The members 160 are pivotally mounted at one end on a rod 164 extending between one of the corner posts 20 and one of the frame members 25. The discharge device is further supported on a latch 165 carried by a latch bar 166 which is pivotally mounted at 167 on a bracket secured to one of the frame members 24. Said latch bar is normally urged in the clockwise direction (Fig. 1) about its pivot by a counterweight 168 carried on a rod 169 secured thereto. A suitable spring could be used equally well.

The latch bar 166 has a projection 170 on the upper end thereof and lying in the path of a lever 171 which is pivoted to one of the members 160 and extends over one of the rollers 163. Said lever carries a roller 172 at its outer end. A vertical rod 173 is pivotally secured to the underside of the cross member 162 and extends downwardly through a suitable opening in the frame member 23. A compression spring 174 surrounds said rod and abuts against the member 23 and against a collar 175 secured to the rod.

In the operation of this part of the apparatus a case 176 which has been completely filled is pushed by the next oncoming case 110 onto the rollers 163. The case 176 strikes the roller 172 and thus moves the lever 171 to strike the projection 170 and tilt the latch bar 166 sufficiently far to the left (Figs. 1 and 3) to move the latch 165 from beneath the angle member 160. The weight of the case 176 and the filled bottles therein is sufficient to cause the discharge device to move downwardly about its pivot rod 164 and against the action of the spring 174. In this movement the filled case moving on the rollers 163 is discharged from the machine onto any suitable receiver or onto a conveyor (not shown) which may carry it to any desired point in the bottling plant.

As soon as the case leaves the rollers 163 the force of spring 174 is sufficient to lift the discharge device above the latch 165, said latch is brought back into place beneath the member 160 by the counterweight 168 and the device is ready to receive another case.

Control apparatus

Since the movements of the receiving member 72, the inspection receiver 100, the guide member 118 and the case moving mechanism are all accomplished by a single rotation of shaft 48, it is obvious that they may be accurately timed with respect to each other without manual control of any kind. However, certain controls are added for the sake of safety and to prevent operation of the machine under abnormal conditions.

One such abnormal condition occurs when the supply of bottles on conveyor 66 is inadequate. In order to push the bottles over the dead plate 71 and onto the receiving member 72, there must be a stream of bottles on the conveyor sufficiently long to insure that the accumulated friction of chain 66 on their bases will overcome the friction of plates 71 and member 72 on the bases of the bottles thereon. To prevent operation of the machine under these conditions, there is provided an electric switch 180 (Fig. 13) located at a proper point on the conveyor 66 and having an operating arm 181 engaged by the bottles 68. As shown diagrammatically in Fig. 16, said switch is biased toward open position and is closed by engagement of the arm 181 by the bottles. Said switch may thus be arranged to stop the operation of motor 30 when the supply of bottles at the switch position fails, as for example when the bottling machine is shut down.

Another abnormality would occur if there is undue resistance to the movement of the cases to the filling position. In order to stop the machine in such an event, there is provided an electric switch shown in Fig. 14. A U-shaped spring 182 is mounted on the rod 148 between the tubular member 150 and the collar 151. Said spring carries contact points 183 suitably insulated therefrom and adapted to engage each other as long as collar 151 and the tubular member 150 are in their normal positions. If, however, the resistance to movement of the cases is sufficient to stretch the springs 152, the rod 148 and collar 151 move relatively of the tubular member 150 to the position shown in Fig. 14. In that position the resilience of spring 182 is sufficient to separate the contact members 183. Said contact members may be arranged in a control circuit for motor 30 which will stop the motor when the contact is broken.

An additional safety feature is provided in the form of a push button 184 which may be placed in any convenient position to be manually operated by the inspector when it is desired to stop the machine.

For control of the lamps 108, there is provided a switch 185 of the push button type (Figs. 2 and 15). Said switch may be operated by a cam 186 on the shaft 48 in timed relation with the operation of the remainder of the machine so that the lamps 108 will be lighted only when bottles are in place at the inspection position.

One form of electrical wiring for the control of the machine is illustrated in Fig. 16. Power may be supplied on a pair of mains 187 to a master switch 188 from any suitable source of current. From the master switch 188 power for the lamps 108 is supplied by a pair of conductors 189, in one of which is inserted the switch 185. Power for the motor 30 is also supplied on conductors 189 to the motor 30 and the solenoid brake 41 by way of a switch 190 operated by a motor control relay 191. A pair of conductors 192 lead from the master switch 188 to the primary winding of a transformer 193. The secondary winding of said transformer supplies power at a suitable low voltage on conductors 194 for the operation of the relay 191. The switches 184, 180 and 183 are connected in series in one of the conductors 194. When the machine is at rest a spring 195 normally retains the solenoid brake 41 in engagement with the brake drum 40 to prevent undesired movement of the parts. When it is desired to start the machine, the switch 188 is closed, thus energizing the circuit for the relay 191 and closing switch 190. The operation of switch 190 supplies power to the solenoid brake 41 which acts in opposition to the spring 195 to release the brake in a well known manner. At the same time, the motor 30 is started and the operation of the machine continues automatically unless one of the switches 183, 180 or 184 is opened temporarily or until the master switch 188 is opened. When either of these events occur, the motor is stopped, the solenoid brake 41 is deenergized and the brake is immediately applied by action of the spring 195.

The foregoing specification describes the invention in one of its preferred forms. The details thereof may, of course, be varied within wide limits without departing from the scope of the invention as defined by the appended claims.

The invention claimed is:

1. In a casing machine for bottled goods adapted to receive a continuous stream of bottles and to deposit the same in a partitioned case, a pivotally mounted member adapted to engage the bases of a plurality of bottles from said stream, a guide member having its guiding surface generally concentric with the pivotal axis of said first mentioned member and adapted to engage the sides of said bottles, and means for moving said pivotally mounted member about said axis to pass said bottles over said guide member, said guide member having diverging channels formed in the surface thereof for spacing said bottles properly for deposition in said case.

2. In a casing machine for bottled goods, bottle guiding means positioned above a case to be filled, a roller adapted to engage a bottle therein and yieldingly holding the same against dropping, and means for rotating said roller to lower the bottle gently toward said case.

3. In a casing machine for bottled goods, bottle guiding means positioned above a case to be filled and adapted to receive a row of bottles, resilient roller means adapted to engage bottles therein, means for simultaneously delivering a row of bottles thereto, and means for rotating said roller means to lower the bottles gently toward said case.

4. In a casing machine for bottled goods adapted to receive a continuous stream of bottles and to deposit the same in a case, bottle guiding means positioned above a case to be filled and adapted to receive a row of bottles, resilient roller means adapted to engage bottles therein, means for moving a row of bottles from said stream to said guiding means, and means for rotating said roller means to lower the bottles gently toward said case.

5. In a casing machine for bottled goods adapted to receive a continuous stream of bottles and to deposit the same in a partitioned case, bottle guiding means positioned above a case to be filled and adapted to receive a row of bottles, resilient roller means adapted to engage bottles therein, bottle moving and spacing means adapted to move a row of bottles from said stream to said guiding means and to space the same apart for deposition in said case, and means for rotating said roller means to lower the bottles gently toward said case.

6. In a casing machine adapted to place articles in a plurality of rows in a case, means located at a receiving station for placing a row of articles in a case, a reciprocating member, and a plurality of pawls carried thereby and adapted to engage said case successively in the movement of said reciprocating member in one direction to move said case step by step toward said receiving station.

7. In a casing machine adapted to place articles in a plurality of rows in a case, means supporting a stream of cases for movement toward a filling position, means at said filling position for depositing a row of articles in a case, a reciprocating member, and a plurality of pawls carried thereby and adapted to engage one of said cases successively in the movement of said reciprocating member in one direction to move said stream step by step toward said filling position.

CURTIS W. GIBBS.